United States Patent [19]

Bright

[11] Patent Number: 5,514,320
[45] Date of Patent: May 7, 1996

[54] METHOD OF MAKING A HOLLOW TOOL

[75] Inventor: John W. Bright, Lansing, Mich.

[73] Assignee: Akemi, Inc., Eaton Rapids, Mich.

[21] Appl. No.: 428,687

[22] Filed: Apr. 25, 1995

[51] Int. Cl.⁶ .................................................. B29C 33/40
[52] U.S. Cl. .................... 264/226; 264/220; 264/225; 264/261; 264/267; 156/245; 156/598; 425/175
[58] Field of Search .................... 156/245, 598; 264/130, 219, 220, 225, 261, 267; 425/175, 403, 470

[56] References Cited

U.S. PATENT DOCUMENTS

| | | | |
|---|---|---|---|
| 2,280,865 | 4/1942 | Stossel | 425/175 |
| 3,183,289 | 5/1965 | Leavesley, Jr. | 425/470 |
| 3,434,182 | 3/1969 | Petersen | 425/470 |
| 3,880,563 | 4/1975 | De Vos | 425/175 |
| 4,125,351 | 11/1978 | Alfter et al. | 425/403 |
| 4,952,355 | 8/1990 | Seward et al. | 264/225 |

OTHER PUBLICATIONS

J. Davy Epoxy Tooling: Evolutions, Applications, Performance and Future, Composites Fabrication, p. 17 (Feb. 1995).

*Primary Examiner*—Michael W. Ball
*Assistant Examiner*—Richard Crispino
*Attorney, Agent, or Firm*—Brooks & Kushman

[57] ABSTRACT

A method and apparatus for making a hollow tool which is used to impart shape to an article. The method comprises: (a) building an outer box around a model of the article; (b) constructing an inner box disposed within and spaced apart from the outer box; (c) applying a fluid laminating agent to an inside surface of the inner box and to the model; (d) removing the inner box after the fluid laminating agent cures to form a solidified shell; (e) supporting the shell so that a space is formed between it and the model; (f) pouring a filling agent into the space, the filling agent bonding to the shell and forming a face that replicates the model; and (g) installing a support structure inside the shell to form the hollow tool, thereby imbuing the tool with the physical characteristics of lightness in weight and durability in shape retention after prolonged exposure to thermal cycling and the thermal characteristics of a uniform heat conductivity over all sections of the tool, regardless of its outside dimensions. The apparatus of the present invention includes a hollow tooling apparatus used to impart shape to an article of manufacture. The tooling apparatus comprises a support structure disposed inside the shell to form the hollow tool.

4 Claims, 2 Drawing Sheets

METHOD OF MAKING A HOLLOW TOOL

TECHNICAL FIELD

This invention relates to a method and apparatus for tool making used to impart shape to an article of manufacture.

BACKGROUND ART

Current tool making methods and apparatus are used to shape parts in various industries. For example, the aircraft aerospace market and automotive companies have been working since the mid-1960s to develop composite parts or panels which will replace metal in airplanes and cars, respectively. Such composites can be made lighter in weight and thereby improve fuel economy in each market sector as a result of improved strength to weight ratios. To impart shape to such composite parts or panels, conventional technology may use tools made of graphite, Kevlar, or polyester.

Heat may be applied to the article in its formation stages to facilitate the creation of tight radii. Under conventional approaches, special precaution is needed to ensure that uneven heat transfer between the tool and the part do not create unwanted discontinuities in the resulting product. Uneven heat flow may be created when thermal capacity differs between thinner and more massive sections of the forming tool.

To indicate the background of the invention and illustrate the state of the art, J. Davy EPOXY TOOLING: EVOLUTIONS, APPLICATIONS, PERFORMANCE AND FUTURE, COMPOSITES FABRICATION, p. 17 (Feb. 1995) is incorporated herein by reference.

Current technology thus far has failed to solve problems often associated with incompatibility between the coefficients of thermal expansion of the tool and the article shaped thereby. Because of often differing coefficients of thermal expansion, a residual thermal stress is often created.

SUMMARY OF THE INVENTION

It is an object of the present invention to provide a tool making apparatus and method for deploying the apparatus in which the forming tool is hollow.

It is also an object of the present invention to provide a tool with the physical characteristics of lightness in weight and durability in shape retention after prolonged exposure to thermal cycling of up to 400° F.

Further, it is an object of the present invention to provide a tool having the thermal characteristics of a uniform heat conductivity over all of its sections, regardless of its outside dimensions.

Broadly stated, the present invention includes a method for making a hollow tool which is used to impart shape to an article.

The method comprises:

(a) building an outer box around a model of the article;

(b) constructing an inner box disposed within and spaced apart from the outer box;

(c) applying a fluid laminating agent to an inside surface of the inner box and to the model;

(d) removing the inner box after the fluid laminating agent cures to form a solidified shell;

(e) supporting the shell so that a space is formed between it and the model;

(f) pouring a filling agent into the space, the filling agent bonding to the shell and forming a laminate with a face that replicates the model; and (g) installing a support structure inside the shell to form the hollow tool, thereby imbuing the tool with the physical characteristics of lightness in weight and durability in shape retention after prolonged exposure to thermal cycling of up to 250° F. and the thermal characteristics of uniform heat conductivity over all sections of the tool, regardless of its outside, overall dimensions.

The apparatus of the present invention includes a hollow tooling apparatus used to impart shape to an article of manufacture. The tooling apparatus comprises an outer box containing a model of the article and an inner box disposed within and spaced apart from the outer box. A laminating agent is disposed upon the model and an inside surface of the inner box, forming a shell upon curing. After the shell is released from the model, a filling agent is disposed between the shell and the model, bonding to the shell and forming a face that replicates the model. Finally, a support structure is provided inside the shell to form the hollow tool, thereby imbuing the tool with the physical characteristics of low mass and shape retention after prolonged exposure to thermal cycling of up to 400° F. and the thermal characteristics of a uniform coefficient of heat conductivity over all sections of the tool, regardless of its external dimensions.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

The present invention relates to a method and apparatus for making a hollow tool, generally indicated at 10, to impart shape to an article of manufacture.

Figure 1:
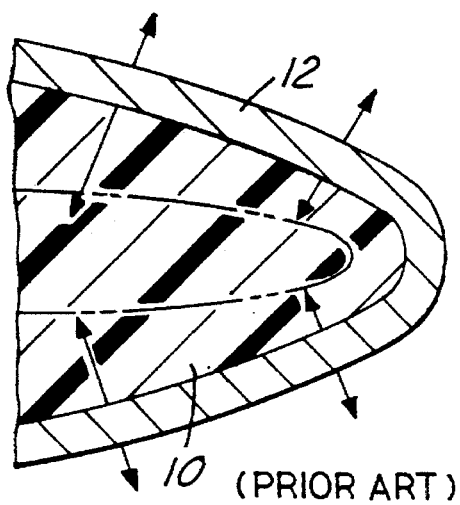
FIG. 1 is a cross-sectional view of an article of manufacture prepared by a conventional tool which is characterized by its solidity and varying thermal capacity.
Figure 2:
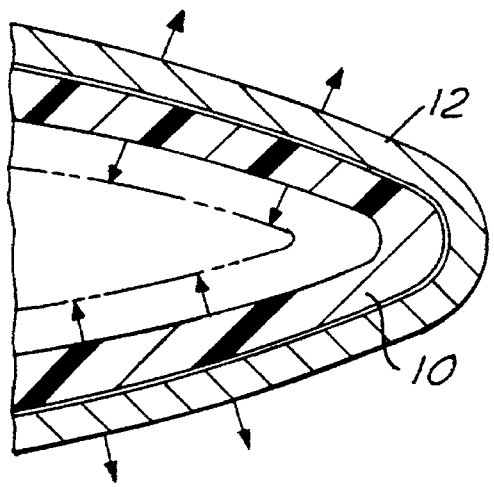
FIG. 2 is a cross-sectional of an article of manufacture shaped by a tool of the present invention.
Figure 3:
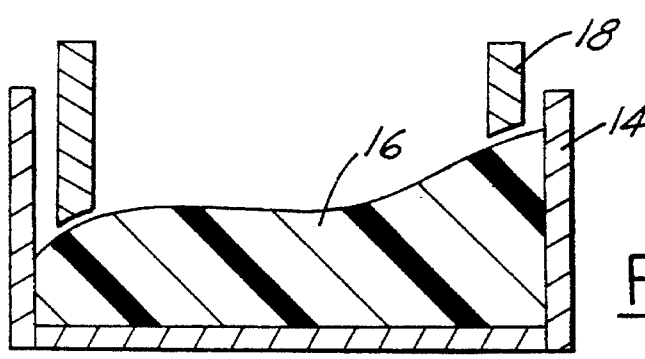
FIGS. 3–8 depict successive steps in the disclosed method for making a hollow tool for imparting shape to an article of manufacture.
Figure 4:
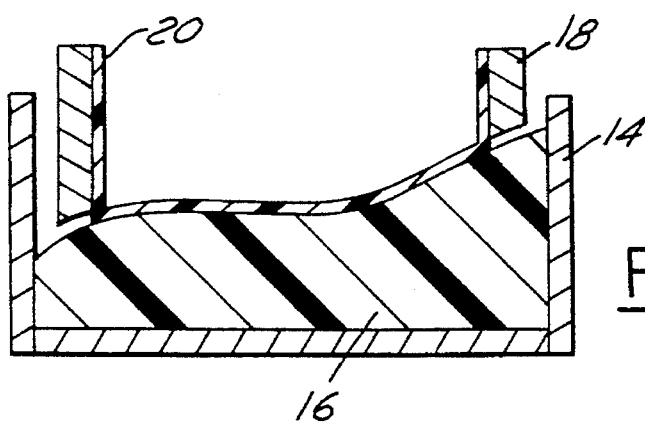

Referring now to FIGS. 1–2, the dashed lines indicate isotherms, or imaginary lines joining locations of equal temperature. In conventional tooling, which is characterized by its massiveness and bulk, the isotherm fails to follow the outside, shaping surface of the tool. As a result, the amount of thermal energy dissipated from the surface of the conventional tool tends to vary with the location on its surface. Because of its uniformity in thickness, as depicted in FIG. 2, the hollow tool of the present invention has the thermal characteristic of a uniform heat conductivity over all sections of the tool.

The method of the present invention includes the following steps, which are depicted in FIGS. 3–8:

(a) building an outer box 14 around a model of the article 12;

(b) constructing an inner box 18 disposed within and spaced apart from the outer box 14;

(c) applying a fluid laminating agent 20 to an inside surface of the inner box 18 and to the model 16;

(d) removing the inner box 18 after the fluid laminating agent 20 cures to form a solidified shell 20;

(e) supporting the shell 20 so that a space is formed between it and the model 16;

(f) pouring a filling agent 24 into the space 22, the filling agent 24 bonding to the shell 20 and forming a face that replicates the model 16;

(g) installing a support structure 26 inside the shell 20 to form the hollow tool 10, thereby imbuing the tool with the physical characteristics of lightness in weight and durability in shape retention after prolonged exposure to thermal cycling of up to 400° F. and the thermal characteristics of a uniform heat conductivity over all sections of the tool, regardless of its outside dimensions.

In addition to the above steps, if desired, a releasing agent should be applied to an inside surface of the inner box 18 and to the model between steps (b) and (c) so that the laminating agent 20 covers the releasing agent.

To facilitate the introduction of a filling agent into the space, a pouring orifice (not shown) may be provided in the shell 20.

Preferably, any residual laminate is removed from the shell after step (c).

Thus, the method aspects of the present invention disclose a method for making tooling, i.e. a structure which is needed to fabricate a part. Such parts may assume various shapes and sizes and may be found in a variety of applications including, but not limited to, the leading edges of wings for aircraft and various panels found on automotive vehicles.

As used herein, a "low temperature" system contemplates forming the finished product and removing it from the tool at temperatures of up to about 220°–250° F., whereas the phrase "high temperature" refers to forming the product and removing it from the tool at temperatures of up to about 350°–400° F.

Figure 5:
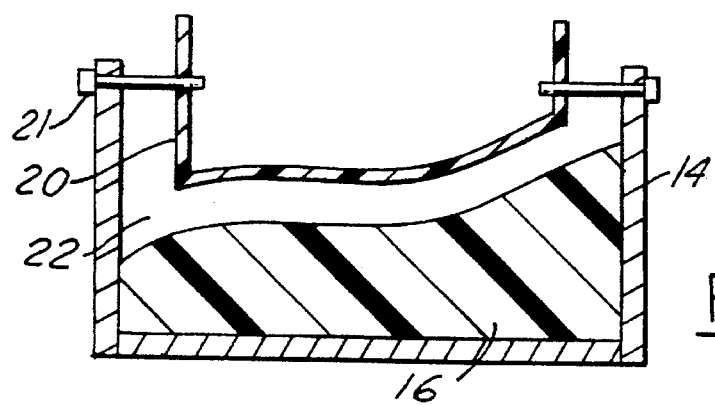

In either case, the invention calls for a laminating agent to form the shell 20 and a casting system or filling agent to fill the space 22 (FIG. 5).

Ideally, for low temperature systems, the fluid laminating agent 20 may be selected from an epoxy laminating system such as AL-2120 made by Akemi of Eaton Rapids, Mich. The "A" component of the laminating system is an AL-2120 resin. A suitable hardener is AL-2120 (hardener), also available from Akemi. Good results have been obtained where the laminating agent is formed from a fiberglass cloth and a laminating resin which is applied at room temperature and sets at a high temperature.

The filling agent 24 or casting system is made of Akemi product AC-2320 (component A) and resin AC-2320 (hardener) (component B).

For high temperature applications, the laminating system is made from a laminating resin such as XP 115-65 resin (component A) made by Akemi, mixed with an XP 115-35 hardener as component B. The casting system is made from an XP 115-65 High Temp (component A) mixed with an XP 115-65 High Temp (component B) hardener.

A number of different wax-like releasing agents may be used. They include but are not limited to conventional paste waxes. If desired, any suitable all purpose release agent may be used.

Good results have been obtained when the inner box 18 is spaced apart from the outer box 14 by a dimension of about ½ inch. For longer tools, such as those needed to fabricate a leading edge of an aircraft wing, the shell 20 may have a thickness of about ¼ inch. For smaller applications, the shell 20 may be about ⅛ inch thick.

FIG. 5 depicts a step in the process wherein the shell 20 is battened in relation to the outer box 14 so that it is supported at an average distance of about ½ inch from the model face and from the inner walls of the outer box. If desired, an orifice can be provided within the shell to facilitate placement of the filling agent 24 (FIG. 6).

Figure 6:
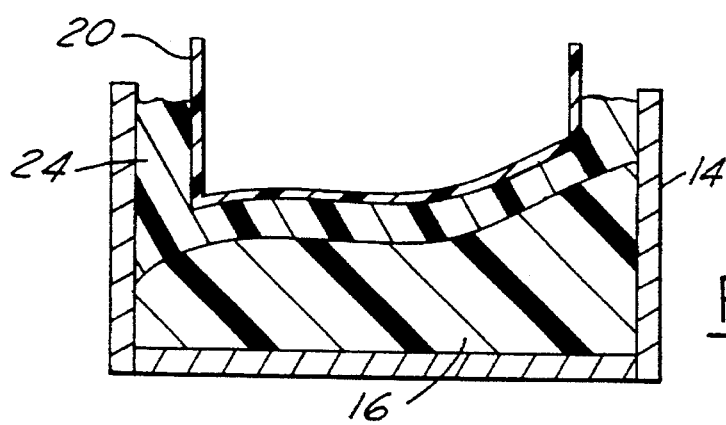
Figure 7:
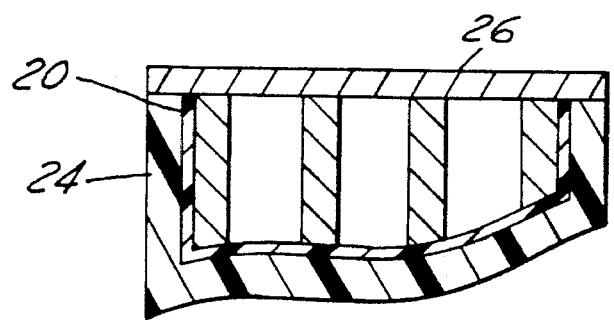
Figure 8:
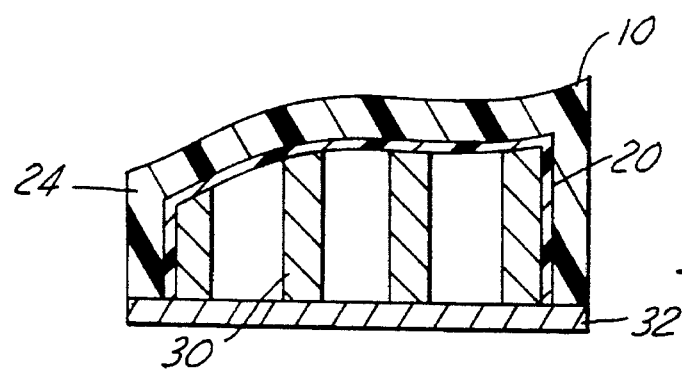

Continuing with primary reference to FIG. 6, the inventors have found that the filling agent 24 will bond to the shell 20, thus providing a solid layer having an average thickness of about ½ inch which will replicate the contours of the model 16.

After the filling agent 24 cures, a support structure 26 (FIGS. 7–8) is installed inside the shell 20. Headers 30 are added for support. If desired, a mounting plate (not shown) may be added to fit the base of the tool. While various materials may be used, suitable selections for low temperature applications include CORELITE, available from Akemi of Eaton Rapids, Mich., which may be used for the support structure 26. Alternatives for high and low temperature environments include an aluminum honeycomb structure or a graphite composite structure or NOMEX, available from DuPont.

If desired, the base 32 may be vented to promote even heat circulation throughout the tool. If it is necessary to maintain elevated temperatures for extended periods of time or to heat the tool face more quickly, any vent holes may be closed using a conventional material such as Akemi, No. 7 high-temperature filler.

Results have shown that the temperature of the tool face is relatively constant, within +/–5° F. in use.

All structural components of the supporting structure 26 have compatible coefficients of thermal expansion. This helps imbue the tool with the ability to retain its shape after prolonged exposure to thermal cycling of up to 250° F. in the low temperature environment. Additionally, the support structure is light in weight and is strong. Thus, there has been provided a hollow tool 10 which has the physical characteristics of lightness in weight and durability and shape retention after exposure to thermal cycling of up to 250° F. in the low temperature environment. The tool possesses the thermal characteristics of uniform heat conductivity over all sections of the tool, regardless of its outside dimensions.

Using the compositions and materials disclosed earlier, the above invention also exhibits the above-noted characteristics in the high temperature environment, i.e. after prolonged exposure to thermal cycling of up to 350°–400° F.

The hollow tool may be used to shape various composites. Noteworthy is that the shell 20 remains in the hollow tool 10, which imparts strength. The shell 20 is uniform in thickness over the entire contour of the tooling face, regardless of the article's configuration. Accordingly, heat transfer problems found in prior art solutions associated with massive tools are substantially avoided.

While the best mode for carrying out the invention has been described in detail, those familiar with the art to which this invention relates will recognize various alternative designs and embodiments for practicing the invention as defined by the following claims.

What is claimed is:

1. A method for making a hollow tool used to impart shape to an article of manufacture, comprising:

(a) building an outer box around a model of the article;
(b) constructing an inner box disposed within and spaced apart from the outer box;
(c) applying a fluid laminating agent to an inside surface of the inner box and to the model;
(d) removing the inner box after the fluid laminating agent cures to form a solidified shell;
(e) supporting the shell so that a space is formed between it and the model;
(f) pouring a filling agent into the space, the filling agent bonding to the shell and forming a laminate with a face that replicates the model;
(g) installing a support structure inside the shell to form the hollow tool, thereby imbuing the tool with the physical characteristics of lightness in weight and durability in shape retention after prolonged exposure to thermal cycling and the thermal characteristics of a uniform heat conductivity over all sections of the tool, regardless of its outside dimensions.

2. The method of claim 1, further comprising:
(h) applying a releasing agent to an inside surface of the inner box and to the model between steps (b) and (c) so that the laminating agent covers the releasing agent.

3. The method of claim 1, further comprising:
(i) providing a pouring orifice in the shell for introduction of the filling agent into the space.

4. The method of claim 1, further comprising:
(h) removing any residual laminate from the shell after step (c).

* * * * *